US005780558A

United States Patent [19]
Klang et al.

[11] Patent Number: 5,780,558
[45] Date of Patent: Jul. 14, 1998

[54] PROCESS FOR MAKING DICYCLOPENTADIENE POLYETHERESTER RESINS

[75] Inventors: Jeffrey A. Klang, Exton, Pa.; Lau S. Yang, Wilmington, Del.

[73] Assignee: Arco Chemical Technology, L.P., Greenville, Del.

[21] Appl. No.: 937,778

[22] Filed: Sep. 25, 1997

[51] Int. Cl.$^6$ .............................. C08F 20/00; C08G 63/42
[52] U.S. Cl. .................. 525/445; 528/274; 528/275; 528/297; 528/300; 528/301; 528/306; 528/307; 525/11; 525/41; 525/42; 525/43; 525/444; 525/437; 524/745; 522/6
[58] Field of Search ........................ 528/274, 275, 528/297, 300, 301, 306, 307; 525/11, 41, 42, 43, 445, 444, 437; 524/745; 522/6

[56] References Cited

U.S. PATENT DOCUMENTS

| | | | |
|---|---|---|---|
| 3,860,052 | 1/1975 | Schroeder | 152/354 |
| 4,140,724 | 2/1979 | Nyi et al. | 568/665 |
| 4,148,765 | 4/1979 | Nelson | 260/22 CB |
| 4,753,982 | 6/1988 | Hefner, Jr. | 525/31 |
| 5,319,006 | 6/1994 | Yang et al. | 523/500 |
| 5,436,313 | 7/1995 | Klang et al. | 528/275 |
| 5,436,314 | 7/1995 | Yang et al. | 528/274 |
| 5,677,396 | 10/1997 | Klang | 525/445 |
| 5,684,086 | 11/1997 | Yang et al. | 525/49 |
| 5,696,225 | 12/1997 | Cai et al. | 528/297 |

OTHER PUBLICATIONS

W. Meyer, *Hydrocarbon Processing*, p. 3, paragraph 2, (1976) 235.

*Primary Examiner*—Samuel A. Acquah
*Attorney, Agent, or Firm*—Jonathan L. Schuchardt

[57] ABSTRACT

A low-cost way to modulate the reactivity and acid number of polyetherester thermoset resins is disclosed. "Beginning" and "end" methods for making dicyclopentadiene (DCPD)-modified polyetherester resins are described. The "beginning" method comprises first heating a polyether, DCPD, a diol, an insertion catalyst, and a carboxylic acid derivative to produce a mixture that contains the polyether and a DCPD-diol diester adduct. Increasing the temperature causes insertion of the DCPD-diol diester into the polyether to give a DCPD polyetherester resin. The "end" method reacts a polyetherester resin made by insertion with DCPD to give a DCPD polyetherester resin. Compared with DCPD polyester resins, those of the invention give more flexible thermosets. Compared with unmodified polyetherester resins, the DCPD polyetherester resins offer formulators more control over curing, which eliminates mold distortion and shrinking or cracking of thermoset parts. Thermosets from blends of the subject resins and DCPD polyester resins show synergistic property improvements compared with thermosets from either resin alone.

26 Claims, No Drawings

PROCESS FOR MAKING DICYCLOPENTADIENE POLYETHERESTER RESINS

FIELD OF THE INVENTION

The invention relates to polyetherester resins made by insertion of a carboxylic acid derivative into a polyether. In particular, the invention relates to a process for making dicyclopentadiene-modified polyetherester resins. Resins of the invention are valuable intermediates for making polyetherester thermosets useful in the unsaturated polyester industry.

BACKGROUND OF THE INVENTION

Recently, we described new processes for making polyetherester resins from polyethers (see U.S. Pat. Nos. 5,319,006, 5,436,313, and 5,436,314, and application Ser. No. 08/619,059, filed Mar. 20, 1996). In each process, a polyether reacts with a cyclic anhydride, a dicarboxylic acid, or a diol diester in the presence of an "insertion" catalyst. The anhydride, dicarboxylic acid, or diol diester inserts randomly into carbon-oxygen bonds of the polyether to generate ester bonds in the resulting polyetherester resin. The polyetherester resin is then combined with a vinyl monomer, preferably styrene, and is cured to produce a polyetherester thermoset. Lewis acids, protic acids having a pKa less than about 0, and metal salts thereof are effective insertion catalysts. The insertion process provides a valuable and versatile way to make many unique polyetherester intermediates.

More recently (see application Ser. No. 08/608,379, filed Feb. 28, 1996), we extended the insertion technology by developing a process for making high-performance polyetherester resins. These high-performance resins are made by chain extending a polyetherester resin (made by insertion) with a primary diol or a diepoxy compound. The high-performance resins give thermosets with improved high-temperature performance, better tensile and flex properties, and enhanced resistance to aqueous solutions—particularly aqueous acid and caustic solutions—compared with those made using the earlier polyetherester resins. Moreover, reaction of polyetherester resins with primary diols or diepoxy compounds provides a way to reduce the acid number of the resin.

Reducing the acid number of a polyetherester resin by reacting it with a glycol or epoxy compound can have undesirable consequences. Molecular weight can increase dramatically from chain extension of the resin, resulting in resins with increased viscosities and altered physical properties. Preferably, the acid number of polyetherester resins could be reduced without significantly changing the molecular weight, viscosity, or other physical properties of the resin.

A more crucial concern, however, is reactivity control. Introducing ester content (from maleic anhydride, e.g.) into resins promotes good curing and good thermoset properties. However, too much unsaturation can make a resin too reactive. Polyetherester resins, particularly those derived principally from unsaturated anhydrides like maleic anhydride, can (like unsaturated polyester resins) cure too rapidly when reacted with a vinyl monomer to make a thermoset. Rapid curing can generate excessive heat, which can cause thermosets to shrink, warp, or crack. Additionally, excess heat can even deform the molds used to make the thermosets. For example, when a cultured marble vanity top is made from a too-reactive resin, enough heat is generated during curing to distort the mold. Upon cooling, the vanity top can shrink excessively or crack.

One remedy is to reduce the amount of maleic anhydride used or to include more of a saturated anhydride (e.g., phthalic anhydride) in the resin, since this reduces resin reactivity and the amount of heat generated during curing. Unfortunately, this approach can adversely impact the physical properties of thermosets made from the resins. Comparative Example 10 below illustrates the problem. Substituting in some phthalic anhydride reduces resin reactivity (as shown by a reduced peak exotherm temperature) but detracts from thermoset physical properties. Preferably, resin reactivity could be controlled without significantly affecting resin or thermoset properties.

Dicyclopentadiene-modified polyester resins (hereinafter called "DCPD polyester resins") are well known. As those skilled in the art appreciate, the structure of these resins varies considerably depending upon the conditions under which they are made. For example, acid-catalyzed addition reactions (of carboxylic acid and hydroxy groups to the more-reactive carbon-carbon double bond of dicyclopentadiene) prevail at reaction temperatures below about 150° C., while cracking of DCPD to cyclopentadiene followed by Diels-Alder additions predominate at higher temperatures. See, for example, W. Meyer, *Hydrocarbon Processing* (1976) 235. Thus, a variety of DCPD polyester resins can be made simply by varying the reaction temperature. Structure also depends on the timing of the DCPD addition. Charging all of the DCPD at the start of the polyester synthesis produces a distinctly different product compared with the one made by a process in which most or all of the DCPD is added following an initial polyesterification.

An advantage of conventional DCPD polyester resins is low cost. In addition, these resins generally offer low viscosity, adequate physical properties, and good curing and surface properties. Unfortunately, however, thermosets from DCPD polyester resins tend to be relatively brittle, lack toughness, and have poor water resistance.

In sum, the industry needs new ways to make low-cost resins that have the curing and surface-property advantages of DCPD polyester resins and also have the flexibility, toughness, and water resistance of polyetherester resins made by insertion. A valuable process would give low-acid-number resins with controlled molecular weights and viscosities. Most important, the process would offer resin producers more control over resin reactivity. It would eliminate thermoset part cracking and mold distortion caused by excessive heat generation during curing, and it would offer these advantages while maintaining a high level of thermoset physical properties.

SUMMARY OF THE INVENTION

This invention provides a low-cost way to modulate the reactivity and acid number of polyetherester thermoset resins. In particular, the invention is a process for making a dicyclopentadiene (DCPD)-modified polyetherester resin (hereinafter called "DCPD polyetherester resin"). The invention includes "beginning" and "end" methods for making the resin. The "beginning" method comprises first heating a polyether, DCPD, a diol, an insertion catalyst, and a carboxylic acid derivative at a temperature within the range of about 25° C. to about 160° C. to produce a mixture that contains the polyether, catalyst, and a DCPD-diol diester adduct. The carboxylic acid derivative is an anhydride or a dicarboxylic acid. Alternately, a diol diester is used instead of the mixture of diol and carboxylic acid derivative. The reaction mixture is then heated at a higher temperature within the range of about 120° C. to about 300° C. under conditions effective to promote insertion of the DCPD-diol diester adduct into carbon-oxygen bonds of the polyether to produce a DCPD polyetherester resin.

The invention includes an "end" method for making a DCPD polyetherester resin. This method comprises heating a polyether, an insertion catalyst, and a carboxylic acid derivative at a temperature within the range of about 120° C. to about 300° C. under conditions effective to promote insertion of the carboxylic acid derivative into carbon-oxygen bonds of the polyether to produce a polyetherester resin. The polyetherester resin is then heated with DCPD at a temperature within the range of about 100° C. to about 300° C. to produce a DCPD polyetherester resin.

Additionally, the invention includes a process for making a DCPD polyetherester resin by heating DCPD and a polyether to produce a DCPD-polyether adduct. Heating the adduct in the presence of a carboxylic acid derivative (anhydride, dicarboxylic acid, or diol diester) and an insertion catalyst gives a DCPD polyetherester resin.

The invention includes resins made by the processes described above. In addition, the invention includes thermosets derived from polymer blends made by combining resins of the invention with DCPD polyester resins.

The process of the invention offers surprising and valuable advantages. Most important, the process gives resin producers more control over resin reactivity, eliminates problems caused by excessive heat generation during curing, and offers these advantages while maintaining a high level of thermoset physical properties. In addition, the invention enables the preparation of low-acid-number polyetherester resins that also have low molecular weights and low viscosities. By incorporating DCPD, the process gives low-cost thermosets with good surface properties. Resins made by the process offer unexpected benefits in thermoset systems, particularly those that use blends of the subject resins and DCPD polyester resins. Finally, the invention offers benefits for particular end uses; for example, the invention offers formulators of cultured marble vanity tops improved toughness and more control over resin curing.

DETAILED DESCRIPTION OF THE INVENTION

The process of the invention includes "beginning" and "end" methods for making DCPD polyetherester resins. In the "beginning" method, a polyether, DCPD, a diol, an insertion catalyst, and a carboxylic acid derivative are heated to form a mixture of polyether, catalyst and a DCPD-diol diester adduct. Heating this mixture at a higher temperature promotes insertion of the DCPD-diol diester adduct into the polyether to give a DCPD polyetherester resin.

Polyethers suitable for use in the invention derive from base or acid-catalyzed ring-opening polymerization of cyclic ethers such as epoxides, oxetanes, oxolanes, and the like, and mixtures thereof. The polyethers have oxyalkylene repeat units (—O-A-) in which A has from 2 to 10 carbon atoms, preferably from 2 to 4 carbon atoms. The polyethers can have different end groups, depending upon how the polyethers are made or modified. For example, the polyether can have hydroxyl, ester, ether, acid, or amino end groups, or the like, or combinations thereof. Mixtures of different types of polyethers can be used.

Preferred polyethers for use in the process of the invention are polyether polyols. Suitable polyether polyols include, for example, polyoxypropylene polyols, polyoxyethylene polyols, ethylene oxide-propylene oxide copolymers, polytetramethylene ether glycols, and the like, and mixtures thereof. Typically, the polyols have average hydroxyl functionalities from about 2 to about 8, and number average molecular weights from about 250 to about 25,000. Preferred polyether polyols have an average hydroxyl functionality within the range of about 2 to about 6, a hydroxyl number within the range of about 28 to about 260 mg KOH/g, and a number average molecular weight within the range of about 400 to about 12,000. Particularly preferred are polyoxypropylene diols and triols having a number average molecular weight from about 1000 to about 4000. Other examples of suitable polyols appear in U.S. Pat. No. 5,319,006, the teachings of which are incorporated herein by reference.

Dicyclopentadiene is commercially available. Most grades of DCPD contain minor amounts of hydrocarbon impurities. While any grade of DCPD should generally be suitable for making DCPD polyetherester resins, the particular grade needed for best results is left to the discretion of the skilled person.

In the "beginning" method, the reactants are first heated at a temperature within the range of about 25° C. to about 160° C., preferably from about 60° C. to about 130° C., and most preferably from about 80° C. to about 130° C., to form a mixture that contains the polyether, catalyst, and a DCPD-diol diester adduct. At this relatively low reaction temperature, insertion does not occur. Rather, the diol reacts with the carboxylic acid derivative to give a diol diester. The diol diester is generated in situ. In an alternative method, a diol diester is used instead of the diol and carboxylic acid derivative. Either way, the diol diester reacts with DCPD to give a DCPD-diol diester adduct. The adduct results from addition of carboxylic acid groups of the diol diester to the more-reactive carbon-carbon double bond of DCPD (see the W. Meyer article referenced above). When the diol diester is generated in situ from the reaction of a diol and a carboxylic acid derivative, it is preferred to use at least about 2 moles of carboxylic acid derivative per mole of diol.

The DCPD-diol diester adduct is then heated at a higher temperature within the range of about 120° C. to about 300° C., preferably from about 150° C. to about 250° C., and most preferably from about 180° C. to about 200° C., in the presence of the polyether and insertion catalyst under conditions effective to promote insertion of the DCPD-diol diester adduct into carbon-oxygen bonds of the polyether to produce a DCPD polyetherester resin. Examples 5 and 6 below (see also Table 1) illustrate the "beginning" method.

Preferred diols are $C_2$-$C_{30}$ diols including, for example, ethylene glycol, propylene glycol, diethylene glycol, dipropylene glycol, triethylene glycol, tripropylene glycol, 1,3-propanediol, 2-methyl-1,3-propanediol, neopentyl glycol, 1,4-butanediol, 1,6-hexanediol, 1,4-benzenedimethanol, 1,3-cyclohexanedimethanol, bisphenol A, bisphenol F, alkoxylated bisphenols, and the like, and mixtures thereof. Suitable diols also include low molecular weight (less than or equal to about 1000) polyoxyalkylene diols such as polypropylene glycols and polytetramethylene ether glycols.

Suitable carboxylic acid derivatives include anhydrides and dicarboxylic acids. Anhydrides useful in the process are cyclic anhydrides, which may be saturated or unsaturated. "Cyclic" anhydrides contain the anhydride functionality within a ring. Examples include phthalic anhydride and maleic anhydride. "Saturated" anhydrides contain no ethylenic unsaturation, but may contain aromatic rings. Examples include phthalic anhydride, propionic anhydride, trimellitic anhydride, and succinic anhydride. "Unsaturated" anhydrides contain ethylenic unsaturation that becomes incorporated into the polyetherester resin. Maleic anhydride is an example. Other examples of suitable anhydrides appear in U.S. Pat. No. 5,436,313, the teachings of which are incorporated herein by reference.

Dicarboxylic acids useful in the process are saturated or unsaturated. Preferred dicarboxylic acids are linear, branched, or cyclic $C_3$–$C_{40}$ aliphatic dicarboxylic acids and $C_6$–$C_{40}$ aromatic dicarboxylic acids. Examples include adipic acid, maleic acid, succinic acid, isophthalic acid, and the like, and mixtures thereof. Additional examples of suitable dicarboxylic acids appear in U.S. Pat. No. 5,436,314, the teachings of which are incorporated herein by reference.

As explained above, a diol diester can be used in the "beginning" method instead of the diol/carboxylic acid derivative combination. Diol diesters useful in the process are reaction products of about 2 moles of a cyclic anhydride with about 1 mole of a diol. The diol diesters have two internal ester units, and two carboxylic acid end groups that result from ring opening of the cyclic anhydride. Suitable diol diesters can be made in other ways well known to those skilled in the art. For example, the diol can be esterified with a dicarboxylic acid or reacted with an acid halide. However, the anhydride route is most convenient. Preferred diol diesters have the general formula:

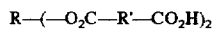

R—(—O$_2$C—R'—CO$_2$H)$_2$ in which R is a bivalent $C_2$–$C_{30}$ alkyl or aralkyl moiety derived from a diol, and R' is a bivalent $C_2$–$C_{20}$ alkyl or aryl moiety derived from a cyclic anhydride. Suitable diol diesters derive from $C_2$–$C_{30}$ diols, including, for example, ethylene glycol, propylene glycol, diethylene glycol, dipropylene glycol, triethylene glycol, tripropylene glycol, 2-methyl-1,3-propanediol, neopentyl glycol, 1,4-butanediol, 1,6-hexanediol, 1,4-benzenedimethanol, 1,4-cyclohexanedimethanol, bisphenol A, bisphenol F, alkoxylated bisphenols, and the like, and mixtures thereof. Preferred cyclic anhydrides from which the diol diesters derive are saturated or unsaturated $C_4$–$C_{20}$ cyclic anhydrides such as maleic anhydride, phthalic anhydride, itaconic anhydride, citraconic anhydride, and the like, and mixtures thereof.

Suitable diol diesters include reaction products of about 2 moles of a cyclic anhydride and about 1 mole of a DCPD ether that has a hydroxyl functionality of at least 2. These DCPD ethers include, for example, the mono-DCPD ethers of glycerol and trimethylolpropane.

The "beginning" method uses a catalyst to insert the DCPD-diol diester adduct into the polyether. Suitable "insertion catalysts" are the ones previously described for inserting anhydrides, dicarboxylic acids, and diol diesters into polyethers. They include Lewis acids (e.g., zinc chloride, zinc bromide), protic acids that have a pKa less than about 0 (e.g., p-toluenesulfonic acid), and metal salts of the protic acids (e.g., zinc triflate). The catalyst is used in an amount effective to promote insertion of the DCPD-diol diester into carbon-oxygen bonds of the polyether to produce a DCPD polyetherester resin. Suitable catalysts are described, for example, in U.S. Pat. Nos. 5,319,006, 5,436,313, and 5,436,314, the teachings of which are incorporated herein by reference.

The process of the invention includes an "end" method for making DCPD polyetherester resins. This method comprises two steps. First, a polyether, an insertion catalyst, and a carboxylic acid derivative selected from anhydrides, dicarboxylic acids, and diol diesters, are heated at a temperature within the range of about 120° C. to about 300° C., preferably from about 140° C. to about 250° C., and more preferably from about 150° C. to about 200° C., under conditions effective to promote insertion of the carboxylic acid derivative into carbon-oxygen bonds of the polyether to produce a polyetherester resin. Synthesis of polyetherester resins as in this step is described, e.g., in U.S. Pat. Nos. 5,319,006, 5,436,313, and 5,436,314, the teachings of which are incorporated herein by reference. The resulting resin is then heated with DCPD at a temperature within the range of about 100° C. to about 300° C., preferably from about 120° C. to about 250° C., and more preferably from about 140° C. to about 180° C., to produce a DCPD polyetherester resin. Examples 1–4 below (see also Table 1) illustrate the "end" method.

Optionally, a capping agent or chain extender is used in the "end" method. The capping agent or chain extender can be added prior to heating the polyetherester resin with DCPD, during the reaction of resin and DCPD, or after the reaction with DCPD is complete. The role of the capping agent or chain extender is to control acid number, regulate molecular weight, or modify performance characteristics of the resin. Suitable capping agents include glycols having a secondary hydroxyl group (e.g., propylene glycol). Suitable capping agents also include DCPD ether alcohols having one free hydroxyl group (e.g., the addition reaction product of equimolar amounts of propylene glycol or 2-methyl-1,3-propanediol with DCPD). Suitable chain extenders include primary diols (e.g., ethylene glycol, 2-methyl-1,3-propanediol, 1,4-butanediol) and diepoxy compounds (e.g., bisphenol A diglycidyl ether).

The "beginning" method also optionally uses a capping agent or chain extender. In this method, the resin is heated with the capping agent or chain extender after the DCPD polyetherester resin is produced.

DCPD polyetherester resins made by either method preferably incorporate from about 2 to about 30 wt.%, more preferably from about 5 to about 20 wt.% of recurring units derived from DCPD. The resins preferably have number average molecular weights within the range of about 500 to about 50,000, preferably from about 1000 to about 10,000.

Finally, the invention includes a process for making DCPD polyetherester resins from DCPD-polyether adducts. This process comprises first heating a polyether and DCPD at a temperature within the range of about 60° C. to about 130° C. to form a DCPD-polyether adduct. Next, the DCPD-polyether adduct is heated at a temperature within the range of about 120° C. to about 300° C. in the presence of an insertion catalyst and a carboxylic acid derivative selected from the group consisting of anhydrides, dicarboxylic acids, and diol diesters under conditions effective to promote insertion of the carboxylic acid derivative into carbon-oxygen bonds of the DCPD-polyether adduct to produce a DCPD polyetherester resin. Optionally, the DCPD polyetherester resin is then heated with a capping agent or chain extender as described above.

Generally, the DCPD polyetherester resins made by any method described above have low acid numbers compared with polyetherester resins made by insertion and not "neutralized" by reaction with a capping agent or chain extender. Preferably, resins made by the process of the invention have acid numbers less than about 60 mg KOH/g, and more preferably less than about 45 mg KOH/g. The ability to produce resins with low acid numbers is an advantage of the process of the invention because other methods for reducing acid number can profoundly affect resin molecular weight, resin viscosity, and thermoset physical properties.

The key advantage of the process of the invention is reactivity control. DCPD polyetherester resins of the invention have reduced levels of reactive unsaturation compared with unmodified polyetherester resins. The reduction in reactive unsaturation results primarily from Diels-Alder addition of cyclopentadiene (generated from DCPD) to carbon-carbon double bonds in the polyetherester chain. By reducing resin reactivity, formulators can better control curing profiles. Importantly, the improvement in curing control is achieved while maintaining good thermoset properties (see Table 1).

One way to measure resin reactivity is with the SPI 180° C. Gel Test. This well-known test measures the peak exotherm temperature for a resin under controlled curing reaction conditions. Unmodified polyetherester resins commonly have peak exotherms in excess of 420° F. (see, e.g., Comparative Example 7 below). For some applications, however, these resins are too reactive in curing with a vinyl monomer (e.g., styrene). A resin that is too reactive can damage molds and can give thermoset parts with cracks, shrinkage problems, or surface defects. The process of the invention enables the preparation of resins that have lower peak exotherms and correspondingly more-controlled curing properties. DCPD polyetherester resins made by the process of the invention preferably have peak exotherms within the range of about 300° F. to about 410° F., more preferably from about 350° F. to about 400° F. As Table 1 shows, incorporation of 11–13 wt.% of DCPD reduces the reactivity of the resin, which gives a peak exotherm in the SPI 180° C. Gel Test of less than 400° F.

The invention includes DCPD polyetherester resins made by the "beginning" and "end" methods, thermoset polymers derived from the resins, and thermosets derived from blends of DCPD polyetherester resins and DCPD polyester resins.

Thermosets of the invention are made by reacting a DCPD polyetherester resin with a vinyl monomer according to methods that are well known for making thermosets from unsaturated polyester resins. Typically a resin mixture that contains vinyl monomer is combined with a free-radical initiator and a cobalt promoter at room or elevated temperature, and the mixture is cured to give a solid product that may be post-cured if desired by heating at elevated temperature. Suitable vinyl monomers, free-radical initiators, and promoters are well known in the art. Examples appear in U.S. Pat. No. 5,319,006, the teachings of which are incorporated herein by reference. The thermosets can include fillers, glass fibers, pigments, or other additives or reinforcing materials.

Of particular interest are thermosets prepared from mixtures of the DCPD polyetherester resins of the invention and commercial DCPD polyester resins. As Table 2 shows, these thermosets exhibit synergistic properties compared with those made from either type of resin alone. Strength properties (tensile strength, flex strength) of thermosets made from blends of the DCPD polyetherester resins and commercial DCPD polyester resins unexpectedly exceed those of thermosets made from either unblended resin. Preferred thermosets derive from resin blends that contain from about 5 to about 95 wt.% of the DCPD polyetherester resin and from about 5 to about 95 wt.% of the DCPD polyester resin. More preferred thermosets use from about 25 to about 75 wt.% of the DCPD polyetherester resin and from about 25 to about 75 wt.% of the DCPD polyester resin.

Among other end uses, resins of the invention offer significant advantages for cultured marble vanity tops. In this application, resin reactivity is critical. If the resin is too reactive, the mold melts and deforms, and the vanity top cracks easily, shrinks, or has surface defects. As Examples 13–14 and Comparative Example 15 below show, resins of the invention give tougher marble tops. As shown in Table 3, marble tops produced from resins of the invention require about double the number of cycles before failure occurs. The 100% improvement in vanity top shock resistance is a surprising and valuable advantage of DCPD polyetherester resins of the invention.

The following examples merely illustrate the invention. Those skilled in the art will recognize many variations that are within the spirit of the invention and scope of the claims.

EXAMPLE 1

"End" Method for Making a DCPD Polyetherester Resin

A twelve-liter reactor equipped with mechanical stirrer, nitrogen sparge tube, and partial condenser is charged with polypropylene glycol (2000 mol. wt., 3202 g) and maleic anhydride (3077 g). The mixture is heated at 75° C. until the anhydride melts. Agitation begins, and a mixture of p-toluenesulfonic acid (7.7 g) and 2-methyl-1,3-propanediol (1413 g) is added. The reaction mixture is heated to 190° C. A strong flow of nitrogen begins, and the condenser jacket is filled with steam to facilitate water removal. When the acid number of the reaction mixture dips to 100 mg KOH/g, more 2-methyl-1,3-propanediol (474 g) is added. When the acid number reaches 32 mg KOH/g, the reaction temperature is reduced to 170° C., and the steam is shut off. Dicyclopentadiene (1200 g, 13 wt.%) is added by dropping funnel over 1 h, and the reaction mixture is held at 170° C. for an additional 2 h. The final acid number of the resin is 24 mg KOH/g. The resin is cooled and blended with 40 wt.% of inhibited styrene. The resin is cured into a hard plastic using MEKP initiator and cobalt-naphthenate catalyst. Table 1 shows physical properties of the cured product.

EXAMPLE 2

The procedure of Example 1 is generally followed, except that only 1014 g (about 11 wt.%) of dicyclopentadiene is used. Final acid number: 22 mg KOH/g. Table 1 shows physical properties of the cured product.

EXAMPLE 3

"End" Method for Making a DCPD Polyetherester Resin

The procedure of Example 1 is generally followed, with the following modifications. Instead of the 2000 mol. wt. polypropylene glycol, a 3000 mol. wt. polyoxypropylene triol (3422 g) is used. Propylene glycol replaces 2-methyl-1,3-propanediol. The initial charge of propylene glycol (1193 g) is added with the p-toluenesulfonic acid, while the remainder (320 g) is added after the acid number dips to about 100 mg KOH/g. When the acid number reaches 53 mg KOH/g, the reaction temperature is reduced to 170° C., and the steam is shut off. Dicyclopentadiene (1200 g, 13 wt.%) is added as described earlier. Final acid number: 37 mg KOH/g. Table 1 shows physical properties of the cured product.

EXAMPLE 4

The procedure of Example 3 is generally followed, except that only 332 g (3.6 wt.%) of dicyclopentadiene is used. Final acid number: 46 mg KOH/g. Table 1 shows physical properties of the cured product.

EXAMPLE 5

"Beginning" Method for Making a DCPD Polyetherester Resin

A reactor equipped as in Example 1 is charged with a 3000 mol. wt. polyoxypropylene triol (3956 g) and maleic anhydride (2692 g). The mixture is heated at 75° C. until the anhydride melts. Agitation begins, and a mixture of p-toluenesulfonic acid (7.7 g) and propylene glycol (1044 g) is added. The reaction mixture is heated to 125° C. Dicyclopentadiene (363 g, 4.3 wt.%) is added by dropping funnel over 1 h. The reaction mixture is heated at 125° C. for another hour, and is then heated to 190° C. A strong flow of nitrogen begins, and the condenser jacket is filled with steam to facilitate water removal. When the acid number of the reaction mixture dips to 90 mg KOH/g, more propylene glycol (372 g) is added. When the acid number reaches 51 mg KOH/g, the resin product is cooled, blended with styrene, and cured as described earlier. Table 1 shows physical properties of the cured product.

EXAMPLE 6

The procedure of Example 5 is followed, except that a 2000 mol. wt. polypropylene glycol replaces the 3000 mol. wt. polyoxypropylene triol. In addition, 439 g (5.2 wt. %) of dicyclopentadiene is used. Table 1 shows physical properties of the cured product.

COMPARATIVE EXAMPLE 7

The method of application Ser. No. 08/619,059, filed Mar. 20, 1996, now allowed, is used to prepare a polyetherester resin by insertion (no DCPD modification). A 3000 mol. wt. polyoxypropylene triol and 35 wt.% maleic anhydride are used. Final acid number of the resin: 31 mg KOH/g. Table 1 shows physical properties of the cured product.

COMPARATIVE EXAMPLES 8 and 9

Two commercially available DCPD polyester resins are combined with styrene and cured as described in Example 1. Table 1 shows physical properties of the cured products.

The results in Table 1 show: (1) the improved flexibility (especially the higher elongation) of thermosets made from polyetherester resins compared with DCPD polyester resins; (2) the good overall physical properties of thermosets from DCPD polyetherester resins; and (3) the reduced peak exotherm values of DCPD polyetherester resins (compared with the unmodified polyetherester resin, Comparative Example 7), particularly when the "end" method is used to make the DCPD polyetherester resin.

COMPARATIVE EXAMPLE 10

A twelve-liter reactor equipped with a mechanical stirrer, a nitrogen sparge tube, and a partial condenser is charged with a polyoxypropylene diol (3000 mol. wt., 3560 g), maleic anhydride (1932 g), and phthalic anhydride (1154 g). The mixture is heated at 75° C. until the anhydride mixture melts. Agitation begins, and a mixture of p-toluenesulfonic acid (7.7 g) and propylene glycol (1045 g) is added. The reaction mixture is heated to 190° C. A strong nitrogen flow begins, and steam is applied to the condenser jacket to facilitate water removal. When the acid number of the reaction mixture dips to 120 mg KOH/g, more propylene glycol (821 g) is added. When the acid number reaches 30 mg KOH/g, the reaction is stopped by reducing the reaction temperature to 100° C. The resin is blended with styrene (40 wt.%), and is cured in the usual way to give a thermoset product. The resin has an SPI Gel Test peak exotherm=385° F. Thermoset properties: tensile strength=5330 psi; tensile modulus=284 ksi; tensile elongation=7.9%; flexural strength=11.6 ksi; flexural modulus=323 ksi.

This example shows that a saturated anhydride (phthalic anhydride) can be substituted for some of the maleic anhydride to give a resin having a peak exotherm in the desired range. This technique is also commonly used to control reactivity of unsaturated polyester resins. However, as the example shows, this resin gives a thermoset having an undesirable dip in physical properties compared with the resin made from only maleic anhydride (see Table 1, Comparative Example 7).

EXAMPLES 11 and 12

Thermosets from Blends of DCPD Polyetherester Resins and DCPD Polyester Resins Table 2 shows the effect of blending DCPD polyetherester resins of the invention with commercially available DCPD polyester resins. All of the products are cured as described in Example 1. Example 3 uses a DCPD polyetherester resin made according to the invention. Comparative Example 8 uses a commercial DCPD polyester resin. Example 11 shows results from a 50/50 (by weight) blend of DCPD polyetherester resin and the commercial DCPD polyester resin. Example 12 shows a 25/75 blend of DCPD polyetherester resin and the commercial DCPD polyester resin. Table 2 shows physical properties of the cured products.

As Table 2 shows, thermoset products from the resin blends unexpectedly give superior tensile and flexural strength compared with thermosets from the unblended resins.

EXAMPLES 13–14 and COMPARATIVE EXAMPLE 15

Preparation of Cultured Marble Vanity Tops

A fully formulated marble resin is prepared by mixing 100 parts of base resin dissolved in styrene with 0.2 parts of 6% cobalt naphthenate (in mineral spirits), 0.2 parts of BYK A-555 (air release agent) and 1 part of BYK A-980 (wetting agent) (products of Byk Chemie). The marble mix is prepared from 100 parts of formulated resin, 300 parts of calcium carbonate (powdered Dolomitic limestone, product of Speciality Minerals), 3 parts of titanium dioxide (product of DuPont) and 8 parts of TRIGONOX 61 (product of Akzo Nobel). The vanity tops are made in commercial quality single-bowl 22"×25" molds. An hour or two before casting the tops, the molds are sprayed with a clear cultured marble gel coat (HK Research G1175) to ca. 25 mil wet film thickness. When the gel coat is only slightly tacky, the marble mix is poured in to fill the mold. After filling, the molds are vibrated to remove air. The tops gel in 25 to 30 minutes, and the vanity top can be demolded in 2 to 3 hours. The completed tops are allowed to post cure at 70° F. to 75° F. before thermal shock testing. The tops are tested using the ANSI Z124.3 thermal shock test method for plastic lavatories, and the number of cycles to failure for each sample is reported in Table 3.

As shown in the table, marble tops produced from resins of the invention require about double the number of cycles before failure occurs. The 100% improvement in shock resistance is a surprising and valuable advantage of cultured marble products derived from DCPD polyetherester resins of the invention The preceding examples are meant only as illustrations; the following claims define the scope of the invention.

TABLE 1

Dicyclopentadiene Polyetherester Resins and Thermoset Properties

| Example # | 1 | 2 | 3 | 4 | 5 | 6 | C7 | C8 | C9 |
|---|---|---|---|---|---|---|---|---|---|
| Polyol | diol | diol | triol | triol | triol | diol | triol | — | — |
| Glycol | MPD | MPD | PG | PG | PG | PG | PG | DEG | DEG/EG |
| % DCPD | 13 | 11 | 13 | 3.6 | 4.3 | 5.2 | — | — | — |
| Method | end | end | end | end | begin | begin | — | — | — |
| Acid # (mg KOH/g) | 24 | 22 | 37 | 46 | 51 | 40 | 31 | — | — |
| SPI gel test peak (°F.) | 323 | 390 | 353 | 436 | 420 | 433 | 445 | — | — |
| Thermoset Properties (clear casting) | | | | | | | | | |
| Tensile strength (psi) | 3940 | 6130 | 8310 | 6980 | 6660 | 7780 | 7620 | 8350 | 7350 |
| Tensile modulus (ksi) | 279 | 361 | 496 | 432 | 326 | 440 | 389 | 499 | 529 |
| Elongation (%) | 2.4 | 8.0 | 5.5 | 2.1 | 3.9 | 2.9 | 3.5 | 2.0 | 1.5 |
| Flex. strength (ksi) | 10.1 | 12.5 | 16.6 | 16.0 | 12.1 | 15.4 | 14.3 | 16.4 | 14.1 |
| Flex. modulus (ksi) | 297 | 360 | 469 | 452 | 336 | 421 | 399 | 527 | 558 |

MPD = 2-methyl-1,3-propanediol; PG = propylene glycol; DEG = diethylene glycol; EG = ethylene glycol.

TABLE 2

Thermosets from Blends of a Dicyclopentadiene Polyetherester Resin and a Commercial DCPD Polyester Resin

| Example # | 3 | 11 | 12 | C8 |
|---|---|---|---|---|
| Wt. % DCPD-mod. polyetherester resin | 100 | 50 | 25 | 0 |
| Wt. % Commercial DCPD resin | 0 | 50 | 75 | 100 |
| Thermoset Properties (clear casting) | | | | |
| Tensile strength (psi) | 8310 | 10,100 | 8520 | 8350 |
| Tensile modulus (ksi) | 496 | 471 | 476 | 499 |
| Elongation (%) | 5.5 | 3.1 | 2.0 | 2.0 |
| Flex. strength (ksi) | 16.6 | 19.7 | 17.1 | 16.4 |
| Flex. modulus (ksi) | 469 | 507 | 519 | 527 |

TABLE 3

Cultured Marble Vanity Tops from Dicyclopentadiene Polyetherester Resins

| Example # | 13 | 14 | C15 |
|---|---|---|---|
| Resin | Ex. 3 | Ex. 2 | commercial[1] |
| SPI Gel Test Peak Exotherm (°F.) | 353 | 390 | 393 |
| Wt. % styrene in resin | 35 | 35 | 32 |
| Wt. % resin in marble | 25 | 25 | 25 |
| Cycles to failure[2] | 1001 | 903 | 490 |

[1]Commercial marble resin based on propylene glycol, maleic anhydride, and phthalic anhydride.
[2]ANSI Z124.3 thermal shock test method for plastic lavatories.

We claim:

1. A process which comprises:
   (a) heating a polyether, dicyclopentadiene (DCPD), a diol, an insertion catalyst, and a carboxylic acid derivative selected from the group consisting of anhydrides and dicarboxylic acids, at a temperature within the range of about 25° C. to about 160° C. to produce a mixture that contains the polyether, catalyst, and a DCPD-diol diester adduct; and
   (b) heating the mixture at a higher temperature within the range of about 120° C. to about 300° C. under conditions effective to promote insertion of the DCPD-diol diester adduct into carbon-oxygen bonds of the polyether to produce a DCPD polyetherester resin.

2. The process of claim 1 wherein the DCPD polyetherester resin contains from about 2 to about 30 wt.% of recurring units derived from DCPD.

3. The process of claim 1 wherein the DCPD polyetherester resin exhibits a peak exotherm in the SPI 180° F. Gel Test within the range of about 300° F. to about 410° F.

4. The process of claim 1 wherein the DCPD polyetherester resin is heated with a capping agent or a chain extender.

5. A DCPD polyetherester resin made by the process of claim 1.

6. A thermoset which comprises the reaction product of the resin of claim 5 and a vinyl monomer.

7. A thermoset which comprises the reaction product of a vinyl monomer and a polymer blend comprising:
   (a) from about 5 to about 95 wt.% of the DCPD polyetherester resin of claim 5; and
   (b) from about 5 to about 95 wt.% of a DCPD polyester resin.

8. The thermoset of claim 7 wherein the polymer blend comprises from about 25 to about 75 wt.% of the DCPD polyetherester resin, and from about 25 to about 75 wt.% of the DCPD polyester resin.

9. A process which comprises:
   (a) heating a polyether, dicyclopentadiene (DCPD), an insertion catalyst, and a diol diester at a temperature within the range of about 25° C. to about 160° C. to produce a mixture that contains the polyether, catalyst, and a DCPD-diol diester adduct; and
   (b) heating the mixture at a higher temperature within the range of about 120° C. to about 300° C. under conditions effective to promote insertion of the DCPD-diol diester adduct into carbon-oxygen bonds of the polyether to produce a DCPD polyetherester resin.

10. The process of claim 9 wherein the diol diester is the reaction product of about 2 moles of a cyclic anhydride with about 1 mole of a DCPD ether that has a hydroxyl functionality of at least 2.

11. The process of claim 10 wherein the DCPD ether is selected from the group consisting of glycerol mono-DCPD ether and trimethylolpropane mono-DCPD ether.

12. The process of claim 9 wherein the DCPD polyetherester resin is heated with a capping agent or a chain extender.

13. A DCPD polyetherester resin made by the process of claim 9.

14. A thermoset which comprises the reaction product of the resin of claim 13 and a vinyl monomer.

15. A process which comprises:
   (a) heating a polyether, an insertion catalyst, and a carboxylic acid derivative selected from the group consisting of anhydrides, dicarboxylic acids, and diol diesters, at a temperature within the range of about 120° C. to about 300° C. under conditions effective to promote insertion of the carboxylic acid derivative into carbon-oxygen bonds of the polyether to produce a polyetherester resin; and
   (b) heating the polyetherester resin with dicyclopentadiene (DCPD) at a temperature within the range of about 100° C. to about 300° C. to produce a DCPD polyetherester resin.

16. The process of claim 15 wherein the DCPD polyetherester resin contains from about 2 to about 30 wt.% of recurring units derived from DCPD.

17. The process of claim 15 wherein before, during, or after step (b), the polyetherester resin is heated with a capping agent or a chain extender.

18. The process of claim 15 wherein the DCPD polyetherester resin exhibits a peak exotherm in the SPI 180° F. Gel Test within the range of about 300° F. to about 410° F.

19. A DCPD-modified polyetherester resin made by the process of claim 15.

20. A thermoset which comprises the reaction product of the resin of claim 19 and a vinyl monomer.

21. A thermoset which comprises the reaction product of a vinyl monomer a polymer blend comprising:
   (a) from about 5 to about 95 wt.% of the DCPD polyetherester resin of claim 19; and
   (b) from about 5 to about 95 wt.% of a DCPD polyester resin.

22. The thermoset of claim 21 wherein the polymer blend comprises from about 25 to about 75 wt.% of the DCPD polyetherester resin, and from about 25 to about 75 wt.% of the DCPD polyester resin.

23. A process which comprises:
   (a) heating a polyether and dicyclopentadiene (DCPD) at a temperature within the range of about 60° C. to about 130° C. to form a DCPD-polyether adduct; and
   (b) heating the DCPD-polyether adduct at a temperature within the range of about 120° C. to about 300° C. in the presence of an insertion catalyst and a carboxylic acid derivative selected from the group consisting of anhydrides, dicarboxylic acids, and diol diesters under conditions effective to promote insertion of the carboxylic acid derivative into carbon-oxygen bonds of the DCPD-polyether adduct to produce a DCPD polyetherester resin.

24. The process of claim 23 wherein the DCPD polyetherester resin is heated with a capping agent or a chain extender.

25. A DCPD polyetherester resin made by the process of claim 23.

26. A thermoset which comprises the reaction product of the resin of claim 25 and a vinyl monomer.

* * * * *